Oct. 4, 1949.    W. J. O'BRIEN    2,483,558
AREA IDENTIFICATION SYSTEM

Filed Aug. 27, 1945    5 Sheets-Sheet 1

INVENTOR.
WILLIAM J. O'BRIEN
BY
ATTORNEY

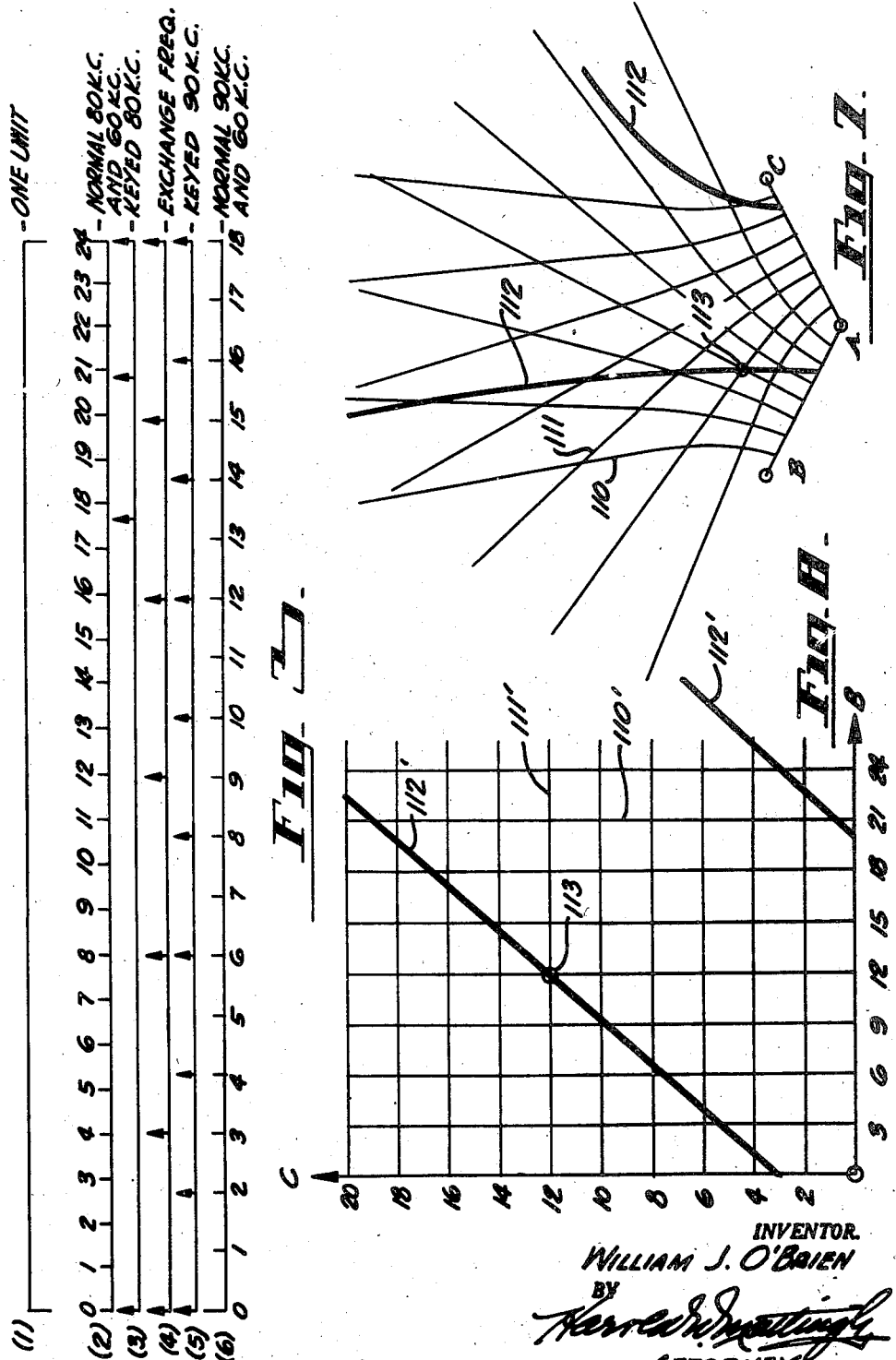

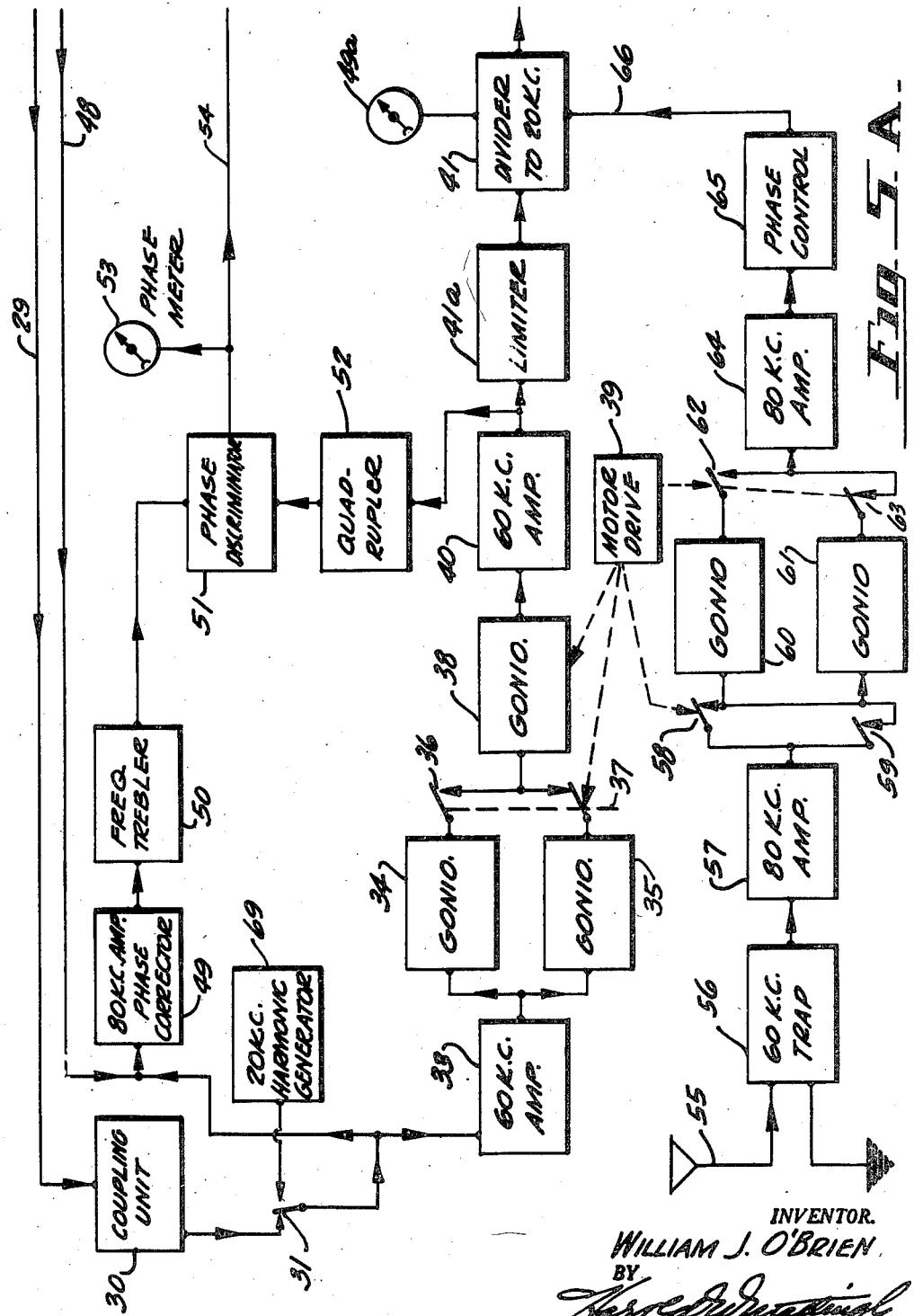

Oct. 4, 1949.　　　　W. J. O'BRIEN　　　　2,483,558
AREA IDENTIFICATION SYSTEM
Filed Aug. 27, 1945　　　　　　　　　　5 Sheets-Sheet 5

INVENTOR.
WILLIAM J. O'BRIEN
BY
ATTORNEY

Patented Oct. 4, 1949

2,483,558

UNITED STATES PATENT OFFICE 2,483,558

AREA IDENTIFICATION SYSTEM

William J. O'Brien, London, England, assignor to The Decca Record Company, Limited, London, England, a corporation of Great Britain Application August 27, 1945, Serial No. 612,999

25 Claims. (Cl. 343—105)

My invention relates to an area identification system for use with radio frequency navigation systems and has particular reference to a method and apparatus for identifying large geographical areas or sectors as an aid in guiding the navigation of mobile vehicles.

In my copending application Serial No. 612,987 filed August 27, 1945 and entitled "Navigation system" I have disclosed a radio frequency navigation system which provides for continually indicating the geographical location of a mobile vehicle equipped with the proper receiving and indicating apparatus. As disclosed in said application the operation of the system depends upon the geographical location of the vehicle being known at the time the system is placed in operation to permit the location indicator to be set to a correct corresponding reading. Once set the indicators will then operate to continually indicate the geographical location of the vehicle as it moves from place to place.

One disadvantage of such a system lies in the fact that under certain circumstances as, for example, when the system is used in the prosecution of a war, it is difficult to know with precision the geographical location of all of the vehicles at the time the system is placed in operation. Furthermore, service interruptions and occasional loss of indications at the receiver location due to maintenance or operating difficulties may cause the location indicators to be inoperative for a length of time sufficient for the vehicle to move into a different part of the equi-phase displacement field and give an erroneous indication upon the resumption of service.

The present invention is directed to an improvement on the system disclosed in my aforementioned copending application and is intended to overcome the above noted disadvantages.

It is, therefore, an object of my invention to provide an area or lane identification system for use with radio frequency navigation systems and which operates from time to time to identify the area, sector or lane within which the vehicle is moving.

It is also an object of my invention to provide a system of the character set forth in the preceding paragraph in which during the identifying operation of the system a coarse position indication is given having a precision of the order of magnitude of 5% of that provided during the normal operation of the navigation system.

It is an additional object of my invention to provide an identification system of the character set forth in the preceding paragraphs in which a sector identification is provided by periodically subjecting the navigation system transmitting apparatus to an alternative mode of operation.

It is a still further object of my invention to provide an identification system of the character hereinbefore mentioned in which the alternative modes of operation of the transmitting equipment produce identifiable changes in the indications given by the receiving apparatus and in which a comparison procedure is employed to identify the one sector which meets the conditions imposed by the plurality of different indications resulting from the alternative modes of operation.

It is also an object of my invention to provide in an identification system of the character set forth in the preceding paragraphs a novel transmitting apparatus which provides for the above-mentioned alternative modes of operation.

It is additionally an object of my invention to provide in an identification system of the character set forth hereinbefore a novel computer permitting rapid identification of the one sector meeting the conditions imposed by the plurality of indications given as a result of the plurality of the alternative modes of operation employed in the operation of the transmitting equipment.

Other objects and advantages of my invention will be apparent from a study of the following specifications read in connection with the accompanying drawings; wherein Fig. 1 is a diagram representative of the transmitter locations and the hyperbolic coordinate system produced by the normal operation of a navigation system such as that disclosed in my aforementioned copending application.

Fig. 3 is a chart representing the partial identifications obtained by each of the alternative modes of transmitter operation;

Fig. 5A is a block diagram illustrating a part of the transmitting equipment which may be used at the master or central transmitter location to obtain the various alternative modes of operation employed in the identification procedure;

Fig. 7 is a field pattern diagram similar to Fig. 1 but illustrating the manner in which a chart may be used in another embodiment of my invention to obtain a positive identification; and Fig. 8 is a drawing representing an alternative form of chart which may be used with the disclosed system.

Figure 1:
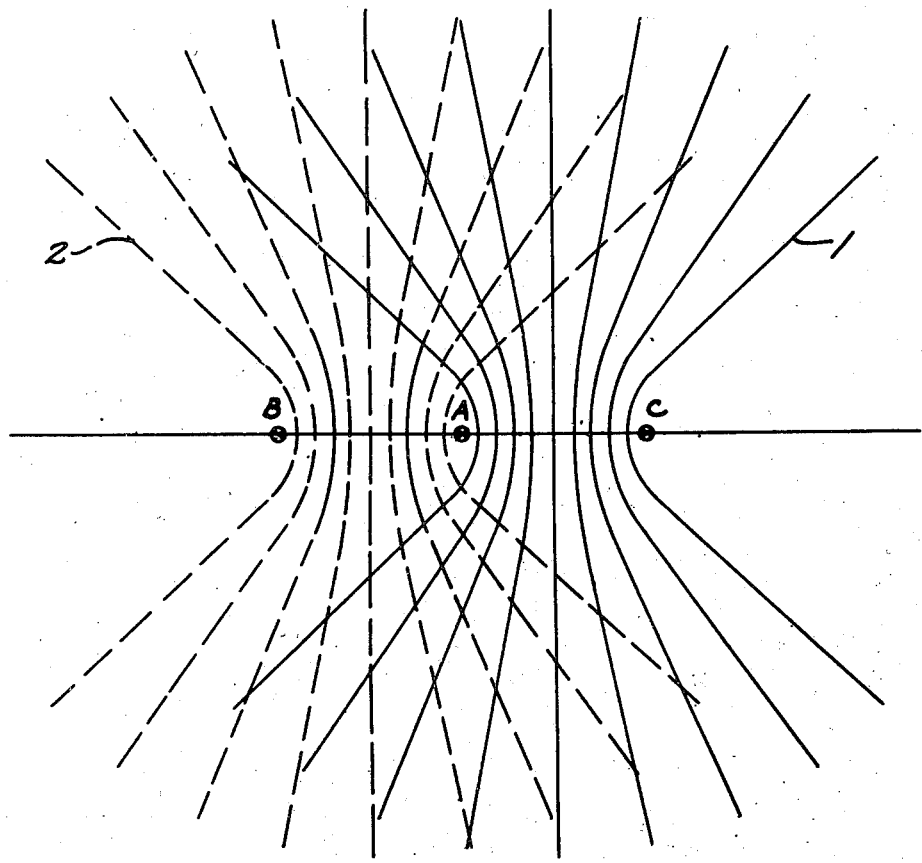

Referring to the drawings, I have illustrated in Fig. 1 three radio frequency transmitters with transmitting antennae spaced from each other and represented by the reference characters A, B and C. In accordance with the disclosure contained in my aforementioned copending application the transmitters A, B and C are continuously operated at different but related frequencies to transmit signals bearing a fixed multiple phase relation to each other to thereby establish overlapping and intersecting field patterns defining a coordinate system comprising contours 1 and 2 of equal multiple phase displacement. In Fig. 1 the contour lines 1 and 2 are intended to represent the locus of all points along which an in-phase relation exists as between the transmissions from A and C, and as between the transmissions from A and B respectively.

For the purposes of simplifying the ensuing description the sector-like area contained between adjacent contour lines 1 will be termed a "lane," as will the sector-like areas disposed between adjacent contour lines 2. Applying this terminology it will be seen that the equi-phase displacement field pattern which is produced by the normal operation of the transmitting apparatus consists of a plurality of overlapping lanes. The phase indicating equipment which is described in the aforementioned copending application is arranged with a full sweep hand which divides the width of a given lane into a large number of smaller sub-divisions as, for example, one hundred. Since the phase shift produced by travelling from one contour line to another contour line of the same system amounts to 360 electrical degrees and one full circle of the indicating hand, it will be seen that the navigation system described operates to indicate with precision the location of the receiving apparatus within a relatively small area defined by the boundaries of the two intersecting lanes within which the vehicle is located. To provide a positive determination of the vehicle's geographical location it is necessary to identify the two intersecting lanes within which the precision measurement is made, and set the recording position indicators accordingly. Thereafter the correct reading is maintained on the position indicators.

The present invention is directed to providing such an indication and in the first embodiment thereof described herein, the identification is obtained by periodically subjecting the transmitting equipment to a plurality of alternative modes of operation designed to produce different equi-phase displacement field patterns characterised by lanes of greater angular scope than the lanes produced by the normal operation of the system.

By comparing a plurality of indications corresponding to the plurality of modes of transmitter operation it is possible to readily determine the one lane which satisfies the conditions represented by all of the different indications given in the alternative operations. By this means I am able to identify one lane out of a relatively large number.

In the example used in the description of the operation of the system, wherein the transmitted frequencies are 60, 80 and 90 kilocycles, I am able to identify one lane out of 24 as between the 60 and 80 kilocycle transmissions, and one lane out of 18 in the 60 and 90 kilocycle transmissions. The total number of lanes produced depends, of course, upon the spacing of the transmitters, so that should the transmitters be spaced closely enough to produce only 18 and 24 lanes respectively a complete and positive identification will be given by the described system.

The alternative mode of operation previously referred to consists in periodically performing the following operations in sequence:

1. During the simultaneous transmissions of the 60, 80 and 90 kilocycle signals from antennae A, B and C, radiating additionally from antenna A signals of 80 and 90 kilocycles. These signals are keyed off and on, and during the keying process the phase of these signals is advanced through an angle of approximately 180°.

2. A resumption of the normal transmission.

3. A continuous unkeyed transmission with the 80 and 90 kilocycle frequencies interchanged, that is, with the 90 kilocycle signals being radiated from antenna B and the 80 kilocycle signals being radiated from antenna C, and 4. During the interchanged transmitting sequence just described radiating 80 and 90 kilocycle keyed and phase rotated signals from antenna A together with a continuous 60 kilocycle signal.

Following these four steps normal transmission is resumed.

A convenient unit of measurement for determining the sensitivity of the indication given by the various modes of transmission is one half wave length of the frequency comprising the largest common factor of the three transmitted frequencies. In the example assumed, the unit distance would equal one half a wave length at a frequency of 10 kilocycles. Under the normal mode of operation, the 60 and 80 kilocycle transmissions produce 24 lanes per unit distance separation of the transmitters A and B, whereas 18 lanes are produced by the 60 and 90 kilocycle transmissions per unit separation of transmitters A and C.

In the first alternate mode of operation 8 lanes per unit separation result from the 80 kilocycle signals from antenna B and the keyed 80 kilocycle signals from antenna A. Nine lanes are produced by a similar comparison of the 90 kilocycle signals. A comparison of the second and third modes of operation provide 6 lanes each per unit separation of the transmitters. In the fourth mode of operation there results 9 lanes per unit separation between the 90 kilocycle signals transmitted from antenna B and the 90 kilocycle keyed signals transmitted from antenna A, and 8 lanes result from the 80 kilocycle signals transmitted from antenna C and the 80 kilocycle keyed signals transmitted from antenna A.

The detection of the vehicle location with respect to the 8 or 9 lanes produced by the first and fourth alternative modes of operation is accomplished by watching the phase angle indicator and counting the number of displacements of the needle from its normal position in a given direction before the direction of the needle displacements reverse.

Figure 2:
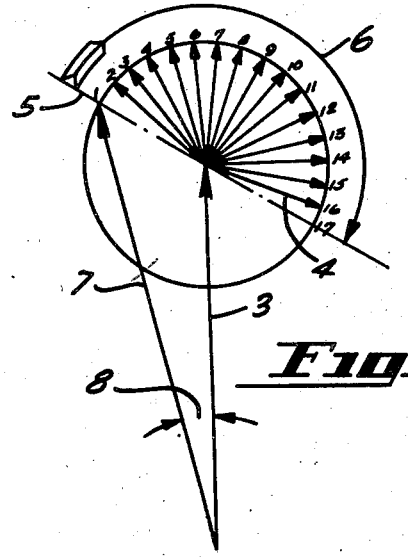
Fig. 2 is a vector diagram illustrating the phase relationships involved in one of the alternative modes of transmitter operation described herein.

This may be explained by a vector diagram such as that shown in Fig. 2. In that figure the arrow bearing the reference character 3 is representative of the absolute phase of the 90 kilocycle signals transmitted from antenna C, whereas the family of short vectors 4 represent the keyed 90 kilocycle signals radiated from antenna A, the successively numbered positions of the vector 4 representing the phase angle of the vector at the time the pulse signal is transmitted from antenna A, it being recalled that during the keying operation the absolute phase of the keyed 90 kilocycle signal from antenna A is subjected to a phase advance of approximately 180° as indicated by the dashed boundary line 5 and arrow 6. The long vector 7 represents the sum of the vectors 3 and 4 and from inspection of Fig. 2 it will be seen that the vector 7 becomes in phase with the vector 3 at a point between the sixth and seventh pulses. Prior to that time the phase of the received signal is ahead of that of the 90 kilocycle signal from antenna C by a continually reducing amount such as is represented by the arrow 8 in Fig. 2. The deflection of the phase indicator is increased over that as indicated by angle 8 by a factor equal to the frequency multiplier incorporated in the receiver. This factor is two for the 90 kilocycle signal and three for the 80 kilocycle signal.

The phase of the vector 3 is indicated by the receiver phase angle indicator in the intervals between 90 kilocycle pulses from antenna A, whereas the phase angle of the vector 7 is indicated during the transmission of the pulses. Since during the first six keyed pulses the relative phase angle 8 is of appreciable magnitude the corresponding phase angle indicator will be displaced from its normal position by an amount representing the magnitude of the phase angle 8. The number of such deflections are counted and in the example illustrated in Fig. 2 the count would be six.

Under certain conditions as, for example, if the phase of the keyed 90 kilocycle signal were to begin substantially at the point marked 15 in Fig. 2 and be advanced through 180° the first deflections would be in the opposite direction so it is necessary to also note the direction in which the first deflections occur as well as the number of such deflections. A like procedure is used for determining the lanes corresponding to the fourth alternative mode of operation.

By means of a beat frequency oscillator in the receiver or by listening directly to the resulting key clicks, an aural aid in counting the number of phase indicator deflections may be had since the maximum audible signal will occur at the time the phase shift is a minimum.

An indication of the six lanes defined by comparing the transmissions under the third and fourth alternate modes of operation is obtained simply by noting the difference angle through which the phase angle indicators are shifted at the time the substitution of frequencies occurs.

Reference should be had to Fig. 3 which illustrates graphically the various forms of indication given and their relation to each other. The line (1) of Fig. 3 represents the angular scope of one unit defined hereinbefore as the distance corresponding to a half wave length at a 10 kilocycle frequency. The line (2) illustrates how that unit separation divides the corresponding sector into 24 lanes as between the continuous 60 and 80 kilocycle transmissions. The line (8) similarly illustrates the relative locations of the 18 lanes produced by the normal 60 and 90 kilocycle transmissions. In line (3) I have shown by means of the small vertical arrow heads the relative locations of the lanes produced by the fourth mode of operation consisting of the keying of 90 kilocycle signals from antenna A. In the fourth line there is shown the 6 lanes per unit distance resulting from comparing the second and third modes of operation.

It will be noted from an examination of chart 3 that while eight out of the twenty-four normal lanes will satisfy the conditions of line (3), and six will satisfy the conditions of line (4), and nine will satisfy the conditions of line (5), there is only one lane out of the twenty-four which will satisfy the conditions of all three lines numbered 3, 4 and 5 in Fig. 3.

Figure 6:
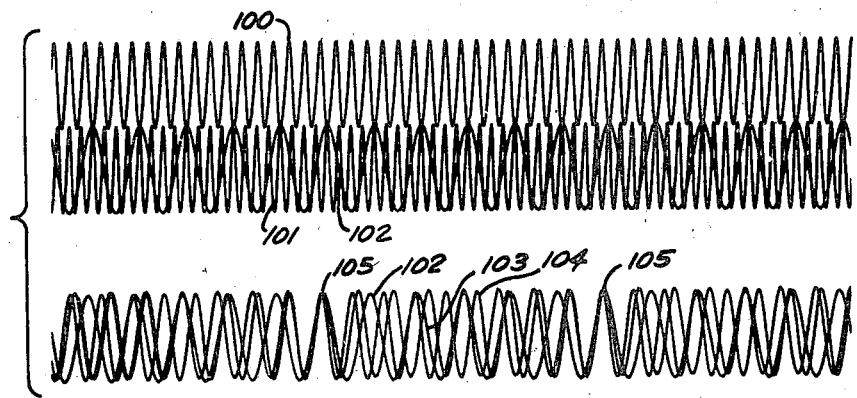
Fig. 6 is a graph presenting in different form the same information as is included in the chart of Fig. 3.

The relation which is represented diagrammatically in Fig. 3 is shown in a somewhat different manner in Fig. 6. In that figure I have represented by the sine wave 100 an eighteen lane per unit separation pattern such as is produced by the 60 and 90 kilocycle signals. The sine wave 101 is representative of the twenty-four lane pattern which is produced by the 60 and 80 kilocycle signals. The second and third alternative modes of transmitter operation (consisting in interchanging two frequencies) operates in a manner analogous to heterodyning signals to produce a lane relationship such as that represented by the sine wave 102 in Fig. 6. It will be noted that this results from coincidence in phase of the sine waves 100 and 102 which coincidence occurs every third lane of the eighteen lane pattern and every fourth lane of the twenty-four lane pattern to thereby provide a six lane pattern.

In the lower part of Fig. 6 I have shown how the six lane pattern 102 may be combined with the eight and nine lane patterns 103 and 104 derived directly from the keyed 80 and 90 kilocycle signals to produce coincidence at the points marked 105. By comparing the locations of these points with the sine waves 100 and 101 it will be seen that the six, eight and nine lane patterns coincide every twenty-fourth lane of the twenty-four lane pattern and every eighteenth lane of the eighteen lane pattern.

Figure 4:
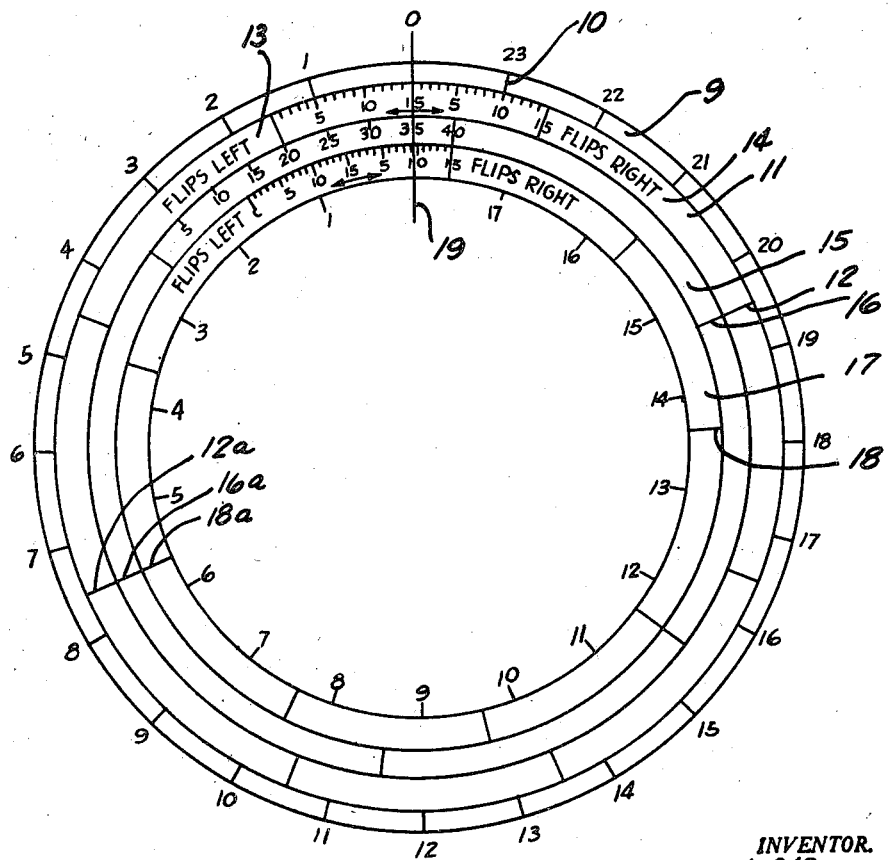
Fig. 4 illustrates a computer or compound vernier which may be used to facilitate interpretation of the received signals.

I have illustrated in Fig. 4 a computer or compound vernier which actually consists of a chart such as Fig. 3 arranged in circular form and which can be used to readily determine which one of the twenty-four lanes satisfies the conditions imposed by the alternate modes of transmission. The computer consists of a base member 9 preferably of circular form and divided uniformly around its periphery into twenty-four equal sectors as by graduations 10. Upon the base member 9 there is mounted a movable disc 11 which is divided as indicated at 12 into eight equal parts representative of the line (3) of Fig. 3.

The space between two adjacent lines 12 is subdivided into smaller divisions equal in number to twice the number of keying impulses used during the first and fourth alternative modes of operation. In the device shown it is assumed that 15 pulses are transmitted during this mode of operation and the subdivided sector is accordingly divided from zero to 15 twice, and the two scales may be identified by suitable legends 13 and 14 placed at the ends of the sub-divided section.

Superimposed upon the movable disc 11 there is placed a second movable disc 15 which is divided into six sectors as by means of lines 16. The space between two adjacent lines 16 is sub-divided into any convenient number of smaller divisions. In the device shown in Fig. 3, forty such divisions have been shown. However, for a phase angle indicator employing a 100 division scale for the full sweep hand confusion in interpretation in reading may be minimised by dividing the sector into 100 divisions instead of the forty shown.

Superimposed upon the disc 15 there is placed a third movable disc 17 which is divided into nine equal sectors as by the radial lines 18. The space between two adjacent radial lines 18 is divided into thirty parts and marked zero to 15 twice in the same manner as has been described in connection with the disc 11. A suitable index line 19 supported as by means of a transparent cover is extended above all the four scales in a position coinciding with the zero of the outer scale 10.

Fig. 4 has been drawn as illustrative of the operation of the identifying equipment. Assume that during the identifying transmitting sequence no needle displacements to the right or clockwise were observed during the first alternative mode of operation but that the displacements corresponding to all 15 keyed pulses from antenna A were to the left. Therefore, the first movable disc 11 will be shifted to a position such as shown in Fig. 4 to indicate opposite the index line 19 fifteen left deflections (or zero right deflections).

Assume also that the shift of the indicated phase angle caused by changing from the second mode of operation to the third mode of operation counted to 35/40 of a full circular travel of the indicating hand. The disc 15 would accordingly be set to the position shown in Fig. 4 reading 35 opposite the index line 19. Finally, assume that during the fourth alternative mode of operation the needle deflections observed consisted of nine deflections to the right followed by six deflections to the left. The third movable disc 17 would, therefore, be set to the position shown in Fig. 4 placing the sub-division 9 of the "flips right" scale opposite the index line 19. Having thus set the scales the instrument is examined to identify the lane. This is done by noting the group of lines 12, 16 and 18 which substantially coincide in angular position with reference to the index line 19. The three lines meeting this requirement have been identified in Fig. 4 by the reference characters 12a, 16a and 18a respectively. The three that line up are used to read on the outer scale 10 the identified lane as being approximately 7.5. That is, as regards the one coordinate established by the navigation system, the position of the vehicle is within the seventh lane.

Attention is directed to the fact that the number of deflections produced by the first alternative mode of operation is determined by observing one of the two phase angle indicators, whereas the number of deflections produced by the fourth alternative mode of operation is determined by the other of the two indicators. Also, the indicated angular shift resulting from changing the transmitter operation from the second mode to the third mode is determined by observing the angle indicated by one indicator before the frequencies are interchanged, and by observing the angle indicated by the other indicator after frequencies are interchanged. Suitable auxiliary scales may be provided on the phase angle indicators for facilitating this observation.

Similar observational technique and the use of a computer or compound vernier scale similar to Fig. 4 is employed for determining the lane in the other coordinate system.

Any suitable equipment may be used for obtaining the sequence of transmitter operations which have been described hereinbefore providing the necessary multiple phase relationships and the proper phase synchronism is obtained. It will be noted that alternative modes of operation 3 and 4 above referred to are, in fact, duplicates of 1 and 2 except for the interchange of frequencies as between antennae B and C. It is intended that this interchange be accomplished by modulating the 60 kilocycle signal radiated from antenna A during the time of the transmission according to alternate modes 3 and 4. Each of the antennae B and C will be equipped with slave type transmittters operating to produce both 80 and 90 kilocycle output signals with relays responsive to the audio frequency modulation of the signals from antenna A to shift the transmitting frequency at B and C antennae from 80 to 90 kilocycles and vice versa. The slave type transmitter may be of the character disclosed in my copending application Serial No. 612,987 filed August 27, 1945 and entitled Navigation system, and may consist of a means for receiving the 60 kilocycle transmissions from antenna A, a frequency converting means for converting the frequency of the received signals to the desired output frequency, and phase locking equipment for maintaining fixed the multiple phase relation between the 60 kilocycle signal transmitted at antenna A and the 80 and 90 kilocycle signals transmitted from antennae B and C. As an alternative arrangement the switching necessary to interchange frequencies at the B and C locations may be made by means of a cam switch driven from a synchronous motor, which motor may derive operating power from the 60 kilocycle signals transmitted from A antenna and subjected to a sufficient frequency division to provide a low frequency suitable for driving such motors.

Figure 5B:
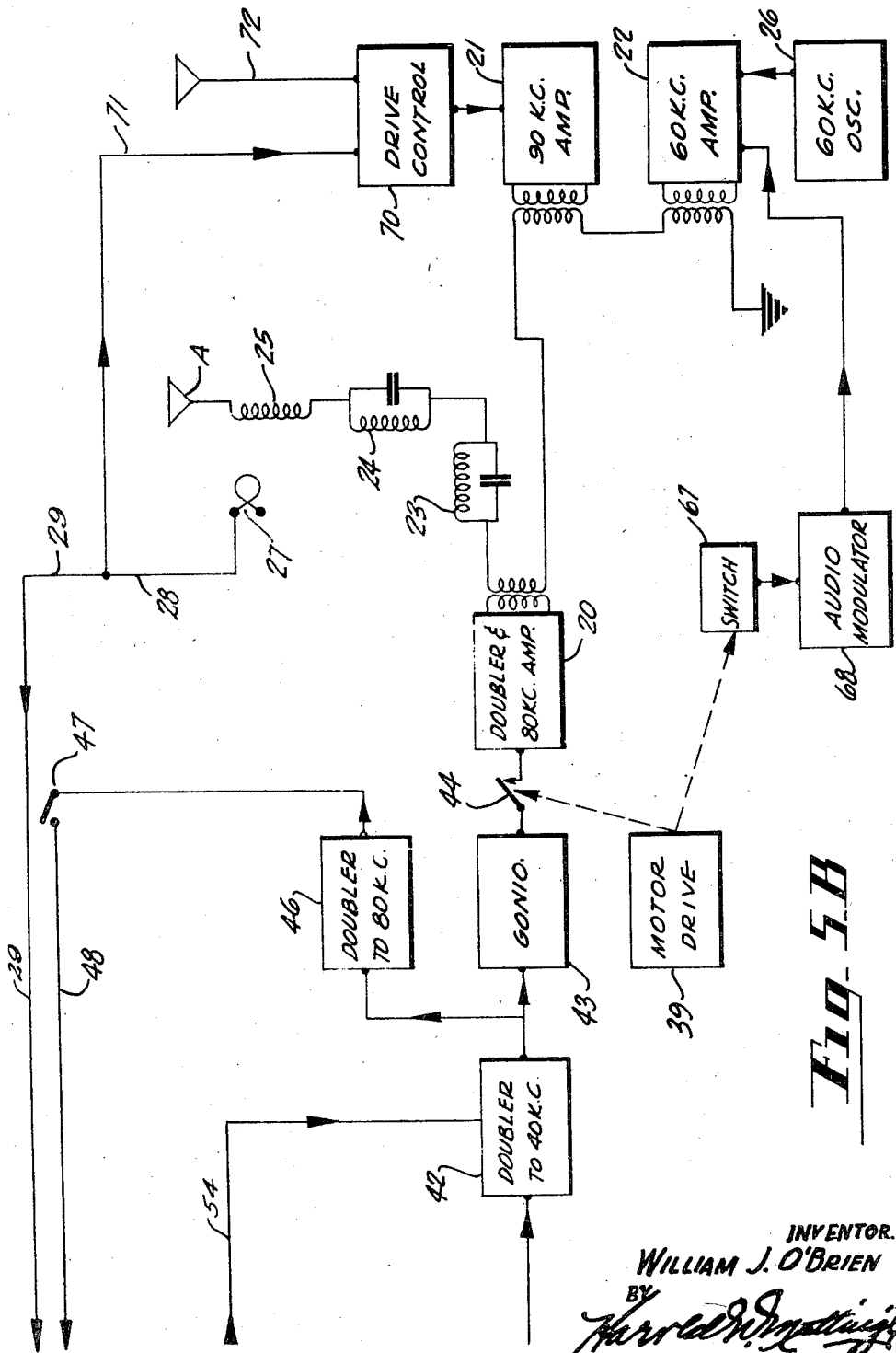
Fig. 5B is a block diagram comprising the continuation of Fig. 5A and illustrating the remainder of the transmitting equipment.

I have illustrated in Figs. 5A and 5B by means of a block diagram equipment which is suitable for use as the transmitting equipment for exciting antenna A. Antenna A is coupled to three power amplifiers identified in Fig. 5B by the reference characters 20, 21 and 22 tuned respectively to frequencies of 80, 90 and 60 kilocycles. The transmitters are coupled to antenna A in a series relationship and there is included also in such circuit three tuned circuits identified by the reference characters 23, 24 and 25 operating to perform an operation equivalent to tuning the antenna A simultaneously to the three frequencies of 80, 90 and 60 kilocycles.

The 60 kilocycle amplifier 22 constitutes the master frequency and phase reference source of the entire system and is accordingly driven by an oscillator 26 which is preferably crystal controlled.

The equipment for transmitting from the A antenna 80 kilocycle keyed signals is illustrated in detail as comprising control and drive equipment for exciting the 80 kilocycle amplifier 20. The frequency source for the control equipment comprises a small pick-up loop 27 coupled as indicated at 28 and 29 through a coupling unit 30 and switch 31 to a 60 kilocycle amplifier 33. The amplifier 33 works into a pair of phase shifters or goniometers 34 and 35, the load circuits of which are connected to switches 36 and 37 permitting either of the two phase shifters 34 and 35 to be connected in circuit with a motor driven goniometer 38.

The diagrammatic indication in Figs. 5A and 5B of a drive motor 39 is intended to represent a motor operated switch and cam arrangement adjusted to control the positions of the switches 36 and 37 and rotate the goniometer 38 during the transmission of keyed impulses from antenna A. The goniometer is coupled to an amplifier 40 tuned to 60 kilocycles and which works into a limiter circuit 41a operating to limit the maximum amplitude of the signals passed to the remainder of the equipment.

The output of the limiter is connected to a synchronised frequency divider 41 which divides the 60 kilocycle input frequency by three to produce a 20 kilocycle output signal. This output signal is passed to a frequency doubling circuit 42 which raises the output frequency to 40 kilocycles. The 40 kilocycle output is passed through a goniometer 43 and through a key 44 to the input of the doubler and 80 kilocycle power amplifier 20 to supply the 80 kilocycle signal to antenna A.

The proper multiple phase relation of the 80 kilocycle signals with respect to the 60 kilocycle signal is obtained by taking an 80 kilocycle signal from the pick-up loop 27 and applying it to the input of an 80 kilocycle amplifier 49. The output of amplifier 49 is passed to a frequency trebler circuit 50 operating to produce a 240 kilocycle output which is applied to one input circuit of a phase discriminator 51.

The other input circuit of the phase discriminator 51 is coupled to a frequency quadrupler 52 operating to produce a 240 kilocycle output from a 60 kilocycle input taken from the 60 kilocycle amplifier 40.

The phase discriminator 51 operates to produce a direct potential representative of the multiple phase relation between the 60 and 80 kilocycle signals. This may be used to operate a phase indicator 53 for visual observation, and, as indicated at 54, the same control potential may be applied to a variable reactance circuit included within the amplifier 42 and operating in response to changes of control potential to vary the phase of the signals amplified by the amplifier 42 in such a way as to maintain the desired fixed multiple phase relation between the 60 and 80 kilocycle signals.

Since the multiple phase relation between the 60 and 80 kilocycle signals can be determined only at a frequency equal to the least common multiple of the frequencies to be compared (in the assumed example, at a frequency of 240 kilocycles) some means must be provided for re-establishing the correct phase lock each time the 80 kilocycle transmissions from antenna A are started. Because there is a factor of three between the 80 kilocycle signals actually transmitted and the 240 kilocycle reference frequency it is possible to obtain a phase lock at three points spaced 120 electrical degrees apart with reference to the 80 kilocycle signals. Only one of these three points will establish the same pattern as that used in laying out the computer shown in Fig. 4.

In order that the phase lock will be established at the proper one of the three possible points and at the proper one only, I employ an apparatus for distinguishing among the three points. This apparatus comprises a receiving antenna 55 connected through a band pass filter 56 adjusted to block 60 kilocycle signals from the input of an amplifier 57 which is tuned to 80 kilocycles to amplify 80 kilocycle signals received from the outlying antennae B or C. The output of the amplifier 57 is connected through switches 58 and 59 to a pair of phase shifters or goniometers 60 and 61.

The output circuits of the goniometers 60 and 61 are connected through switches 62 and 63 to an amplifier 64 tuned to 80 kilocycles. The amplifier 64 is connected through a phase adjuster 65 and as indicated at 66 to the frequency divider 41 to supply to the frequency divider 41 the synchronising signals for starting the frequency divider 41 in the proper synchronism with the 60 kilocycle input signals received from the limiter 41a.

Within the divider circuit 41 the 80 kilocycle signal from the phase adjuster 65 is mixed with the 60 kilocycle signal received from the limiter 41a to produce the characteristic 20 kilocycle heterodyne wave having a high amplitude peak every third cycle of the 60 kilocycle frequency and every fourth cycle of the 80 kilocycle frequency. This relatively high peak is used to drive the 20 kilocycle output circuit of the divider 41, thus removing the aforementioned one in three ambiguity. It will be appreciated that the aforementioned high amplitude peak occurs only when the maxima of the 60 and 80 kc. potentials substantially coincide in time, and that by using this phenomenon for controlling the synchronization of the divider circuit, I may establish completely reproducible phase relations between the two 80 kc. signals. Accordingly, hereinafter and in the appended claims I have used the expression "synchronizing a divider circuit" as meaning so operating the divider circuit as to re-establish the above explained reproducible phase relation.

Once the divider 41 is caused to lock in on the proper one of the three positive peaks of the 60 kilocycle signal the need for the 20 kilocycle synchronising signal is obviated. Accordingly, the motor drive 39 is arranged to close the switch 58 momentarily to establish the proper phase synchronization. Immediately thereafter the switch 58 is opened.

Provision is made for establishing proper operating conditions for the phase synchronizing equipment. This apparatus includes a frequency doubler 46 the input of which is connected to the 40 kilocycle output of the phase controller 42. The 80 kilocycle output of the doubler 46 is connected through a manually operable switch 47 and conductors 48 to the input of the amplifier 49.

In initially adjusting the equipment during a period of normal transmission the switch 47 may be closed and the switch 59 closed to connect the output of amplifier 57 through goniometer 60. The manually operable phase control 65 is then adjusted to give a maximum reading on a plate ammeter 49a connected in the divider circuit 41. The maximum plate current reading is obtained at the time the positive maxima of the 20 kilocycle mixed signal coincide with maxima of the 60 kilocycle signals received from the limiter 41a. Finer adjustment is obtained by then operating the manual switch 59 as a key and adjusting the phase controller 65 until no shift is observed in the indication given by the phase meter 53. When this condition obtains, the apparatus is properly adjusted.

In the adjustment procedure just described the phase control 65 is used to adjust for phase shifts occurring through the entire channel extending from the antenna 55 to the frequency divider 41. The goniometers 60 and 61 are low Q circuits and no phase shift in these instruments will ordinarily take place. This permits the single phase controller 65 to be used for both positions of switches 62 and 63.

In the initial adjustment of the system the goniometers 34 and 60 are adjusted to establish the desired field pattern to conform to the first alternative mode of operation of the transmitters. Similarly the goniometers 35 and 61 are adjusted to provide the proper pattern for the fourth alternative mode of operation. The proper adjustments may be made with the use of an auxiliary receiving apparatus placed for test purposes at a known geographical location.

In operation the key 44 is normally open so that only 60 kilocycle signals derived from the amplifier 22 are radiated by antenna A. The motor drive 39 is arranged to first momentarily close switch 58 to establish the required phase synchronization, and then to start the keying operation by the alternate closing and opening of the switch 44 while, at the same time, holding the switches 36, 37, 62 and 63 in positions including goniometers 34 and 60 in the circuit. During the keying of the switch 44 the goniometer 38 is rotated by the motor drive 39 through an angle slightly less than that corresponding to a 180° phase rotation at the 80 kilocycle frequency. If the keying operation consists of 15 keyed pulses, the goniometer will be rotated through $7/20$ of a full circle to provide $14/15$ of a 180° phase rotation in the 80 kilocycle signal.

At the completion of the first keying sequence operation the motor drive operates to close a switch 67 placing in operation the low or audio frequency modulator 68 for modulating the 60 kilocycle signals derived from amplifier 22. As before stated this operates the slave drive equipment at antennae B and C to interchange the frequencies radiated from these two antennae. Subsequently switch 58 is momentarily closed to again establish the proper phase "tooth" lock and switches 36, 37, 62 and 63 are thrown to positions connecting goniometers 35 and 61 into the circuit. Thereafter the switch 44 is again opened and closed to key the 80 kilocycles radiations from antenna A while, at the same time, the motor drive revolves the goniometer 38 through another $7/20$ of a full circle. Finally all switches are returned to normal.

The phase meter 53 is employed to permit the operation of the equipment to be checked at any time. The meter 53 is read at the time the final adjustments of the equipment are completed, at which time the switch 31 is thrown to an alternate position to substitute as an input to the drive equipment a 20 kilocycle signal which is rich in harmonics bearing a fixed multiple phase relation to each other. This signal is derived from a suitable generator 69. When the generator is switched in, the reading of the phase meter 53 is noted as a standard reference reading so that in subsequent operation of the equipment throwing the switch 31 to the check position should result in the meter 53 giving the same reference reading. If the indication given is different from the reference reading an adjustment is made in a phase shifter included in amplifier 49 to re-align the equipment and re-establish a reading on the meter 54 equivalent to the reference reading.

Reference has been made hereinbefore to transmitting from antenna A simultaneously with the keyed 80 kilocycle signal keyed 90 kilocycle signals. These signals are derived from the power amplifier 21 which is driven by control equipment identical to that described for driving the amplifier 20. This identical equipment is represented in Fig. 5 by the single rectangle bearing the reference character 70. The input signal for exciting the drive equipment is obtained from the pick-up loop 27 as indicated at 71. The 90 kilocycle control signals received from the B and C locations are picked up by a receiving antenna 72. Except for the frequencies at which the equipment operates the equipment included within the rectangle 70 is identical to that described for obtaining the keyed 80 kilocycle signals.

The apparatus and method hereinbefore described operates to provide a series of separate indications upon the phase angle or position indicators included as a part of the radio receiving equipment intended to be used with the navigational system of my invention. Such receiving equipment is preferably of the type disclosed in my copending application Serial No. 612,991, filed August 27, 1945 and entitled Multiple channel radio frequency receiver.

In certain circumstances as, for example, when the receiving equipment is mounted on a high speed vehicle such as an aeroplane operating relatively near the transmitting apparatus it is possible for the vehicle to move a distance of more than one lane during the identification procedure. If this occurs the identification is correct but there is a possibility that the indicators will be placed in normal operation carrying an indication inconsistent with the lane identification. In the ensuing paragraphs there are described a number of alternative modes of operation which may be used to avoid this and similar difficulties.

In accordance with one embodiment of my invention the following procedure is used:

The three transmitters are normally operated at 60, 80 and 90 kilocycles in accordance with the disclosure contained in my first aforementioned copending application. Periodically the operation is altered to provide identification indications at the location of the mobile receiver. These alternative modes of operation include: first, adding to the 60 kilocycle transmissions from antenna A keyed 80 and 90 kilocycle signals in the manner hereinbefore described to give a coarser pattern of nine lanes per unit and eight lanes per unit.

Thereafter the transmitter at antenna B operating at 80 kilocycles is operated as a master transmitter with the transmitting equipment at antenna A operated as a slave transmitter, the frequency and phase being controlled by receiving master signals from the B location. This permits transmitting simultaneously from the B location 60 kilocycle keyed signals which together with the continuous 60 kilocycle signals radiated from antenna A provide a single pattern of six lanes per unit.

Third, the slave type of operation of the transmitter at the B location is restored and the transmitter at the C location is operated as a master transmitter to control as a slave transmitter the apparatus at the A location, the frequency and phase relations of the 60 and 80 kilocycle signals radiated from antennae A and B being controlled through the reception of 90 kilocycle signals radiated from antenna C. This permits the simultaneous radiation from antenna C of keyed 60 kilocycle signals permitting a coarser pattern to be established providing six lanes per unit distance separation.

The indications obtained are employed in a manner analogous to that described in connection with the first embodiment of my invention. The resulting lane identification is not quite as free from ambiguity as the first described modification of my invention since it identifies one lane in six as between the 60 and 90 kilocycle signals and one lane in twelve as between the 60 and 80 kilocycle signals.

In the preceding paragraphs reference has been made to the transmission of keyed signals in the operation of the transmitting equipment as master and slave type. The apparatus required for such operation may be the same as disclosed herein and as disclosed in my first aforementioned copending application wherein a complete description is given of both the master and slave type of transmitting equipment.

According to still another embodiment of my invention the alternative mode of transmitter operation following the normal mode of operation for navigational purposes consists in sending from the C and B locations keyed signals having frequencies of 80 and 90 kilocycles respectively. This is followed by transmitting from the A location keyed signals having frequencies of 80 and 90 kilocycles.

I have illustrated in Fig. 7 a type of chart which may be used with the above described procedure to identify the lane location of the vehicle. In Fig. 7 the transmitting antennae A, B and C are shown as not lying on the same straight line, although an equivalent chart results if the transmitters are aligned.

The series of hyperbolic lines bearing the reference characters 110 and 111 represent respectively the one in three and the one in two lanes identified by the transmission of 80 and 90 kilocycle keyed signals from A location. The hyperbolic lines bearing the reference character 112 are representative of the one in eight and nine lanes resulting from the transmissions of keyed 80 and 90 kilocycle signals from the C and B locations.

The locations of these lanes may be obtained from the instrument illustrated in Fig. 4 by counting the phase indicator deflections and properly setting the inner and outer adjustable discs 14 and 17. When the lane 112 is identified an inspection of the chart is made to determine the point at which that lane and two of the lines 110 and 111 intersect at the same point, such a point of common intersection being indicated at 113 in Fig. 7. This is the identified location of the vehicle.

I have found that at large distances from the transmitters A, B and C it is somewhat difficult to determine the point of mutual intersection of the three lanes. Accordingly, a preference is expressed for a chart of the character shown in Fig. 8 wherein the lines 110' are representative of the hyperbolic lines 110 of Fig. 7, and wherein the lines 111' are representative of the hyperbolic lines 111 of Fig. 7. By using this as a rectangular grid the physical geography can be plotted on the basis of the new coordinate system. This, of course, distorts the geographical lines but has the advantage that the hyperbolic lines 112 of Fig. 7 appear as straight diagonal lines as shown at 112' in Fig. 8. Since these lines may be caused to lie at substantially 45° with respect to the lines 110' and 111' through a proper choice of scale, the point of mutual intersection 113 may be more easily identified.

As another embodiment of my invention suitable for beacon or course indication, I may normally transmit and receive 80 and 60 kilocycle signals from the B and C locations comprising the fourth and third harmonics of a 20 kilocycle transmitted from location A. This provides a series of 24 beacon lanes per unit separation. Identification may be had by successively transmitting phase rotated keyed signals at 60 kilocycles from the B location and similar signals at 80 kilocycles from the C location. The number of phase indicator deflections are counted in the manner hereinbefore described and the instrument shown in Fig. 4 may be used on scales 14 and 15 to reduce the lane ambiguity to one in twelve.

From the foregoing it will be observed that I have disclosed a number of alternative modes of operating radio navigational apparatus in such a way as to provide at the location of the mobile vehicle and with the same receiving equipment at the mobile vehicle as is used for the reception of the navigational signals to provide an identification indication serving to materially reduce the ambiguity in the coordinate indication. This permits the operator of the vehicle to, from time to time verify his geographical location in rough terms amounting to substantially the area embraced by two intersecting lanes. The navigational signals transmitted between identification signals serves to give precise indications of the geographical location within the identified area. Attention is directed to the fact that in each instance the identification is obtained by a specified mode of operation of the transmitting equipment and a specified manner of interpretation of the signals received. No additional receiving equipment is required, this is of importance since it permits the weight of the receiving equipment to be kept to a minimum as is greatly desired in the case of equipment designed for use on aircraft.

While I have shown and described the preferred embodiment of my invention I do not desire to be limited to the details of construction which have been shown and described herein except as defined in the appended claims.

I claim:

1. The method of guiding the navigation of a mobile vehicle which consists in simultaneously radiating from three spaced points radio frequency signals of different but related frequencies having a fixed multiple phase relation to produce intersecting equi-phase field patterns defining a fine repetitive geographical coordinate system; and from time to time interchanging the frequencies of the signals radiated from two of said points.

2. The method of guiding the navigation of a mobile vehicle which consists in simultaneously radiating from three spaced points radio frequency signals of different but related frequencies having a fixed multiple phase relation to produce intersecting equi-phase field patterns defining a fine repetitive geographical coordinate system; from time to time radiating from one of said points other signals having the same frequency as signals radiated from another of said points; and keying said other signals off and on while rotating the phase thereof through a substantial angle.

3. The method of guiding the navigation of a mobile vehicle which consists in simultaneously radiating from three spaced points radio frequency signals of different but related frequencies having a fixed multiple phase relation to produce intersecting equi-phase field patterns defining a fine repetitive geographical coordinate system;

from time to time radiating from one of said points other signals having the same frequency as signals radiated from another of said points; and keying said other signals off and on while rotating the phase thereof through substantially one half of an electrical circle.

4. The method of guiding the navigation of a mobile vehicle which consists in simultaneously radiating from three spaced points radio frequency signals of different but related frequencies having a fixed multiple phase relation to produce intersecting equi-phase field patterns defining a fine repetitive geographical coordinate system; from time to time radiating from one of said points two other signals having the same frequencies as the signals radiated from the other two points; and keying said other two signals off and on while rotating the phase thereof through substantially one half of an electrical circle.

5. The method of guiding the navigation of a mobile vehicle which consists in simultaneously radiating from three spaced points radio frequency signals of different but related frequencies having a fixed multiple phase relation to produce intersecting equi-phase field patterns defining a fine repetitive geographical coordinate system; from time to time interchanging the frequencies of the signals radiated from two of said points; radiating from the other of said points before and after interchanging frequencies of the other two points two other signals having the same frequencies as the signals radiated from the other two points; and keying said other two signals off and on while rotating the phase thereof through substantially one half of an electrical circle.

6. The method of guiding the navigation of a mobile vehicle which consists in simultaneously radiating from three spaced points radio frequency signals of different but related frequencies having a fixed multiple phase relation to produce intersecting equi-phase field patterns defining a fine repetitive geographical coordinate system; from time to time subjecting the character of the signals radiated from said spaced points to a plurality of changes to thereby produce a plurality of unlike intersecting equi-phase field patterns defining a plurality of unlike coarse repetitive geographical coordinate systems; and receiving all of said signals at the location of said vehicle and determining the multiple phase relation among said signals at said location to thereby provide a separate determination of the possible geographical location of said vehicle for each of said repetitive coordinate systems, whereby the location of said vehicle is identified as that which is consistent among all of said separate determinations.

7. The method of guiding the navigation of a mobile vehicle which consists in simultaneously radiating from three spaced points radio frequency signals of different but related frequencies having a fixed multiple phase relation to produce intersecting equi-phase field patterns defining a fine repetitive geographical coordinate system; from time to time radiating from two of said points signals of different frequencies each a harmonic of the signals radiated from the third point; and interchanging frequencies between said two points.

8. In a radio frequency navigation system, a method of establishing a reproducible phase relation between radiated signals of a given frequency derived from signals of another frequency and other signals of said given frequency radiated from another location and bearing a fixed multiple phase relation to said signals of another frequency, which consists in dividing signals of said other frequency by a unique factor of said frequencies to produce an output signal, multiplying the frequency of said output signal by another unique factor to produce said radiated signals of said given frequency, heterodyning said other signals of said given frequency with said signals of another frequency to produce a beat note having the same frequency as said output signal, and employing said beat note to synchronize said step of dividing signals of said other frequency.

9. The method of detecting the keying of a radio frequency signal of given frequency which consists in rotating the phase of said keyed signal during keying, and indicating continuously the multiple phase relation between signals of said given frequency and signals of a different but related frequency and fixed phase.

10. The method of detecting the keying of radio frequency signals which consists in simultaneously radiating from spaced points continuous signals of different but related frequencies bearing a fixed multiple phase relation to each other, radiating from one of said points keyed signals having the same frequency as the continuous signals radiated from the other of said points, rotating the phase of said keyed signals during keying, and indicating the multiple phase relation between received signals of said different frequencies.

11. The method of detecting the keying of a radio frequency signal of given frequency which consists in rotating the phase of said keyed signal during keying, indicating continuously the multiple phase relation between signals of said given frequency and signals of a different but related frequency and fixed phase, and indicating aurally the amplitude changes resulting from said keying.

12. The method of detecting the keying of radio frequency signals which consists in simultaneously radiating from spaced points continuous signals of different but related frequencies bearing a fixed multiple phase relation to each other, radiating from one of said points keyed signals having the same frequency as the continuous signals radiated from the other of said points, rotating the phase of said keyed signals during keying, indicating the multiple phase relation between received signals of said different frequencies, and indicating aurally the amplitude changes resulting from said keying.

13. The method of synchronizing a divider circuit for dividing signals of a given frequency to a lower frequency prior to multiplying to a third frequency which consists in heterodyning standard signals of said third frequency with signals of said given frequency to produce a beat note having said lower frequency, employing said beat note to synchronize said divider circuit, and shifting the phase of said standard signal to produce a maximum plate circuit flow in said divider circuit.

14. The method of synchronizing a divider circuit for dividing signals of a given frequency to a lower frequency prior to multiplying to a third frequency which consists in heterodyning standard signals of said third frequency with signals of said given frequency to produce a beat note having said lower frequency, employing said beat note to synchronize said divider circuit, determining the multiple phase relation between said low frequency and signals of said given frequency, and shifting the phase of said standard signal to an angle causing no change in said multiple phase relation upon interruption of said standard signal.

15. In a radio frequency navigation system, the combination of: means for radiating from two spaced points three radio frequency signals of unlike frequency each comprising a harmonic of a given fundamental frequency and each bearing a fixed multiple phase relation to the others to establish alternate equi-phase displacement field patterns; receiving means for receiving said signals and determining the multiple phase relations among said signals with respect to each of said patterns; and means for comparing the determined phase relationships to fix the location of said receiver with respect to a field pattern equivalent to that obtained by radiating signals consisting solely of said fundamental frequency.

16. In a radio frequency navigation system, the combination of: means for radiating from two spaced points three radio frequency signals of unlike but related frequencies each bearing a fixed multiple phase relation to the others to establish alternate equi-phase displacement field patterns; and receiving means for receiving said signals and determining the multiple phase relations among all of said signals and between each of two pair of said signals.

17. In a radio navigation system, the combination of: means for simultaneously radiating from three spaced points radio frequency signals of different but related frequencies and bearing a fixed multiple phase relation to each other; and means for periodically interchanging between two of said points the frequencies of the signals radiated therefrom.

18. In a radio navigation system, the combination of: means for simultaneously radiating from three spaced points radio frequency signals of different but related frequencies and bearing a fixed multiple phase relation to each other; means for periodically also radiating from one of said points other frequencies having the same frequency as signals radiated from another of said points; and means for rotating the phase of said other signals through substantially one half of an electrical cycle.

19. In a radio navigation system, the combination of: means for simultaneously radiating from three spaced points radio frequency signals of different but related frequencies and bearing a fixed multiple phase relation to each other; means for periodically also radiating from one of said points two other signals having the same frequencies as the signals radiated from the others of said points; means for keying said other two signals; and means for rotating the phase of said other two signals through substantially one half of an electrical cycle.

20. In a radio navigation system, the combination of: means for simultaneously radiating from three spaced points radio frequency signals of different but related frequencies and bearing a fixed multiple phase relation to each other; means for periodically interchanging between two of said points the frequencies of the signals radiated therefrom; means for periodically also radiating from the third one of said points two other signals having the same frequencies as the signals radiated from the others of said points; means for keying said other two signals; and means for rotating the phase of said other two signals through substantially one half of an electrical cycle.

21. In a radio navigation system, the combination of: means for radiating radio frequency signals of a given frequency and fixed phase; means for radiating other radio frequency signals of a frequency different from said given frequency but related thereto; means for keying said other signals; means for rotating the phase of said other signals; means for receiving said signals; and means for measuring and continuously indicating the multiple phase relation between the received signals of given frequency and those of said other frequency.

22. In a radio navigation system, the combination of: means for radiating radio frequency signals of a given frequency and fixed phase; means for radiating other radio frequency signals of a frequency different from said given frequency but related thereto; means for keying said other signals; means for rotating the phase of said other signals; means for receiving said signals; and means for detecting and indicating the changes in amplitude of said received signals resulting from the keying of said other signals.

23. In a radio frequency navigation system, an apparatus for deriving signals of a given frequency from signals of another frequency and establishing a reproduceable phase relation to other signals of said given frequency radiated from another location and bearing a fixed multiple phase relation to said signals of another frequency, comprising: a frequency divider circuit for dividing said signals of other frequency by a unique factor of said frequencies to produce an output signal; means for multiplying the frequency of said output signal by another unique factor to produce said derived signals of given frequency; means for mixing said other signals of given frequency with said signals of another frequency to produce a beat note having the same frequency as said output signal; and means for applying said beat note to said frequency divider circuit to synchronize the operation thereof.

24. The method of reducing the ambiguity of a radio frequency navigation system for aiding the navigation of mobile vehicles and normally operating to establish a navigational pattern characterized by a given ambiguity which consists in from time to time establishing a plurality of alternative ambiguous navigational patterns each different from said normal pattern, and separately determining the possible locations of said vehicle with respect to said normal pattern and with respect to each of said alternative patterns, whereby the location of said vehicle is identified as that which is consistent among all of said separate determinations.

25. In a device for reducing the ambiguity of a radio frequency navigation system operating to indicate a number of possible locations of a mobile vehicle with respect to a plurality of different repetitive radio frequency field patterns, the combination of: a plurality of members each identified with a different one of said patterns and each having a dimension representative of a plurality of cycles of the corresponding repetitive pattern; spaced indicating means dividing said dimension of each member into a number of equal parts equal to the number of said cycles represented by said dimension; means defining a witness point fixed with respect to one of said members; and means mounting each of the other of said members for movement relative to said witness point to a position representative of one of the locations of said vehicle with respect to the pattern with which said member is identified, whereby the location of said vehicle is identified as that indicated by the location on said one member at which said spaced indicating means of the others of said members occupy substantially identical positions.

WILLIAM J. O'BRIEN.

REFERENCES CITED

The following references are of record in the file of this patent:

UNITED STATES PATENTS

| Number | Name | Date |
|---|---|---|
| 2,144,203 | Shanklin | Jan. 17, 1939 |
| 2,148,267 | Honore | Feb. 21, 1939 |